United States Patent [19]
Gamertsfelder

[11] 3,747,094
[45] July 17, 1973

[54] CORRELATOR
[75] Inventor: George R. Gamertsfelder, Pleasantville, N.Y.
[73] Assignee: Singer Company, New York, N.Y.
[22] Filed: Aug. 27, 1962
[21] Appl. No.: 220,126

[52] U.S. Cl....... 343/5 MM, 250/202, 250/219 DR, 343/100 CL, 343/100 ME, 356/168
[51] Int. Cl.............................................. G01s 9/00
[58] Field of Search ............... 343/5 MM, 100 MG, 343/100 CL; 88/1 HV, 14 E, 24 H; 250/201, 202, 203, 219.11, 219 CR, 219.4, 219 DR; 173/178; 244/14.3; 356/168

[56] References Cited
UNITED STATES PATENTS
| | | | |
|---|---|---|---|
| 2,424,193 | 7/1947 | Rost et al...................... | 244/14.3 X |
| 2,787,188 | 4/1957 | Berger ............................ | 343/5 |
| 2,814,199 | 11/1957 | Waldorf et al.................. | 343/5 |
| 2,897,373 | 7/1959 | Lesti ................................ | 250/201 |
| 3,041,011 | 6/1962 | Dhanes ............................ | 343/5 |

Primary Examiner—Benjamin A. Borchelt
Assistant Examiner—Richard E. Berger
Attorney—S. A. Giarratana and T. W. Kennedy

EXEMPLARY CLAIM

1. A correlator for measuring the relative position of two objects by means of radiant energy comprising,
an object emitting radiant energy,
another object constituting a planar replica thereof positioned at a first selected distance from said object,
a detector for detecting radiated energy, said detector including a planar sensing area positioned at a second selected distance from said replica, said replica being smaller than said object in the ratio of said second distance to the sum of said first and second distances, said replica including means directing said emitted radiant energy toward said detector whereby a correlation pattern of radiation intensity is applied to said planar sensing area, the distance of the center of said correlation pattern from the center of the planar sensing area being a measure of the miscorrelation of said replica with said object.

11 Claims, 5 Drawing Figures

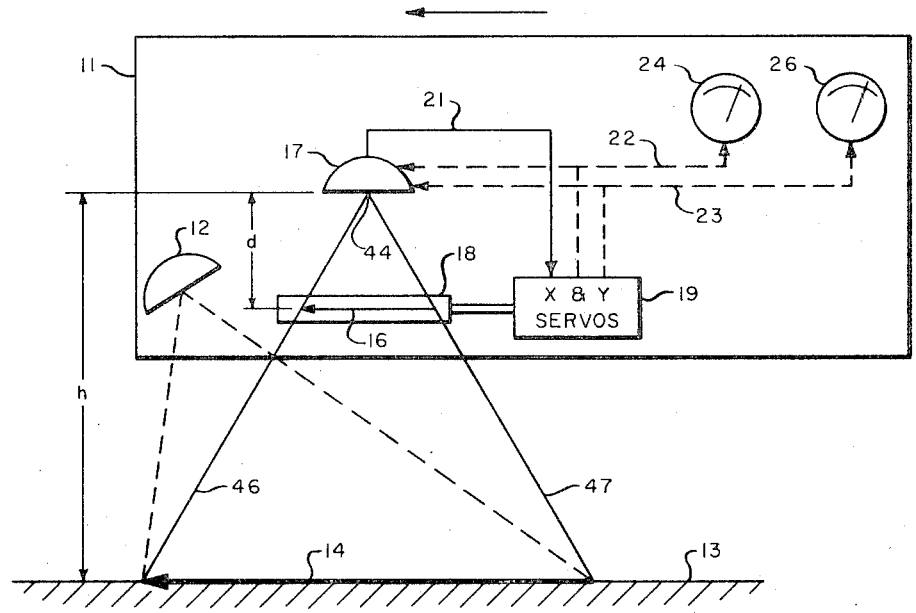
FIG. 1
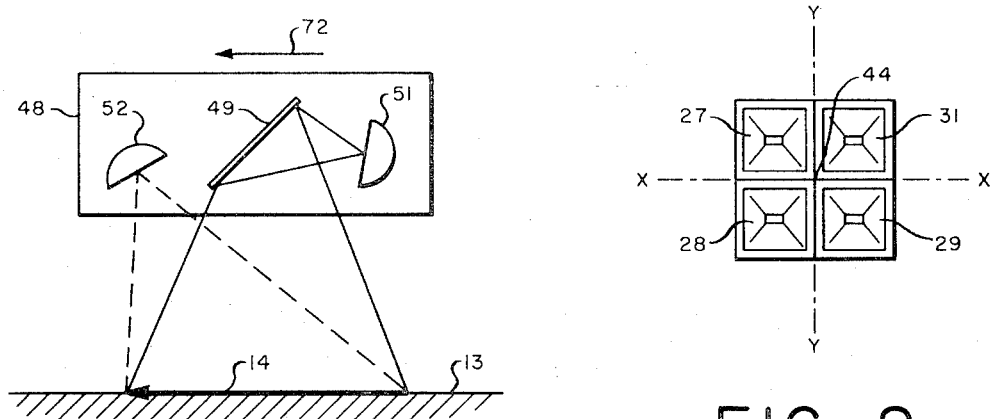
FIG. 4
FIG. 2
*INVENTOR.*
GEORGE R. GAMERTSFELDER
BY *H. S. Mackey*
ATTORNEY.

INVENTOR.
GEORGE R. GAMERTSFELDER

CORRELATOR

This invention relates to correlators using electromagnetic radiation including infrared, visible light and microwave radiations, and more particularly to such correlators for finding the position of fit of greatest likeness of a pattern to another known, reference pattern.

The principles of correlators are generally described in U.S. Pat. No. 2,787,188, Optical Cross-Correlator by F. B. Berger.

The correlators of the present invention have a wide variety of uses. One example of a particular use is as a position-fixing device for aircraft, employing a map of the terrain beneath the aircraft. Infrared, visible or microwave radiation is used, and by a lensless arrangement the terrain and the map are compared. The replica, or map of the terrain, may be prepared, in accordance with the kind of radiation which is used, so that its pattern is either transmissive or reflective of the radiation, and suitable correlation equipment is employed. The mismatch of the two patterns may be observed directly or, through a servomechanism, caused to give a position indication. Extensions of the position-fixing idea lead to other navigational aids.

When two identical or similar positive transmission patterns are correlated, the correlation function has a positive peak and the maximum transmission of radiation occurs at the position of maximum correlation. When, however, one pattern is positive and the other is negative in the photographic sense, maximum correlation is indicated by the occurrence of minimum transmission of radiation. This method has the advantage that the contrast, or ratio between the peak at correlation and the transmission of radiation at noncorrelation is much greater than in the first method. Either method can be used in any case. These two methods can also be used to correlate two reflection patterns, or to correlate a reflection pattern with a transmission pattern.

The use of infrared and microwave radiations have the advantage over the use of visible light that they are operative both night and day with natural radiation from the earth, while visible natural light is usable only in the daytime. Infrared has the advantage over microwaves that the apparatus is much smaller but microwaves will penetrate the atmosphere when visible light and infrared radiations will not. The far infrared, particularly at certain wavelengths longer than 7½μ, is preferable to the near infrared because it penetrates the atmosphere better.

An object of this invention is to provide a correlator for two patterns employing infrared, visible or microwave radiation.

Another object is to provide a correlator for two patterns one of which is a terrain pattern and the other of which is a prepared map of the terrain, the latter map being selectively transmissive of the radiation employed.

Still another object is to provide a correlator for two patterns one of which is a terrain pattern and the other of which is a prepared map of the same terrain, the map being selectively reflective of the radiation employed.

A further understanding of the invention may be secured from the detailed description and drawings, in which:

FIG. 1 is a diagram of the optics of a lensless correlator employing microwave radiation or visible light.

FIG. 2 is a sketch of a microwave sensing detector for use with the correlator of FIG. 1.

FIG. 4 is a diagram of the optics of a lensless correlator employing infrared radiation.

Figure 3:
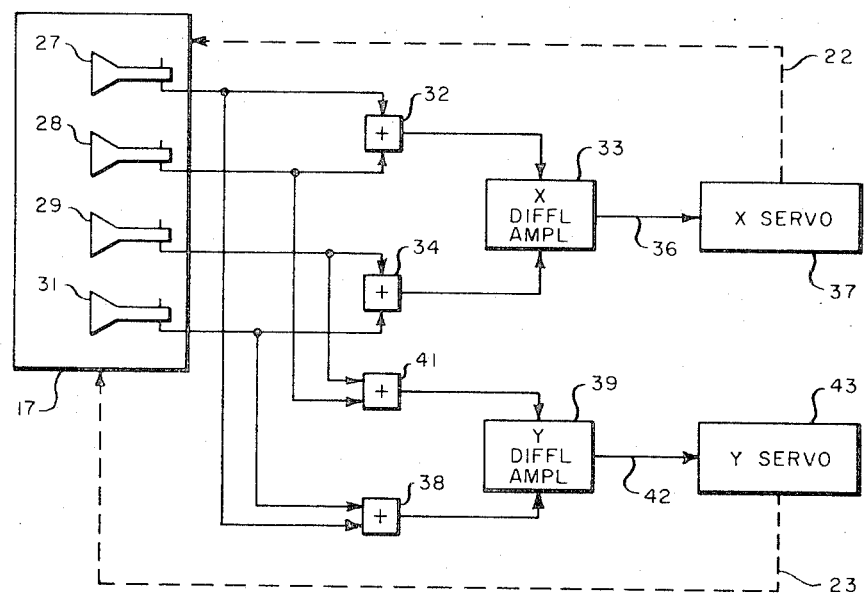
FIG. 3 is a schematic diagram of the correlator of FIG. 1.

Referring now to FIG. 1, an aircraft is represented by the rectangle 11 flying toward the left at the altitude $h$. It carries a microwave transmitter 12 which irradiates the earth 13 over an area represented by the arrow 14. The aircraft also carries a reference map, represented by the arrow 16, of that part of the terrain over which the aircraft passes which is to be correlated. This map is positioned in a plane parallel to the plane of the terrain 14, and is so constructed as to constitute a positive transmissive transparency for microwave energy, so that it transmits microwave energy most strongly through those portions which represent the most strongly microwave reflective parts of the represented terrain. Such a reference map can be made of a polystyrene sheet, or other material transparent to microwave radiation, with the parts which are to be nontransmissive covered with metal foil or any microwave absorbing material. By photographic means, using the half-tone process and using electrically conducting ink instead of the metal foil, gradations of transmission can be secured corresponding to gradations of microwave reflectivity of the represented terrain. As is well understood in the art, the reference map should be large enough so that its finest details are no less than 10 or 15 times the wavelength of the microwave energy employed.

The aircraft also carries a microwave radiation receiver having a detector 17 suitable for the microwave frequency employed. This detector 17 is placed at a distance $d$ from the reference map 16. The map case 18 is secured to a servomechanism 19 which moves the receiver 17 in a plane parallel to the map 16 in obedience to signals received from the receiver 17 through conductors 21. The servomechanism output shafts 22 and 23 operate dials 24 and 26 indicating the position of the receiver 17 in two corrdinate directions relative to the map 16.

The geometry of FIG. 1 requires that the scale of the map 16 of the terrain 14 must be made equal to $d/h$, or the ratio of the distance between the map and receiver to the altitude. The reason for this requirement lies in the necessity that all rays drawn from points in the terrain 14 through corresponding points in the map 16 must converge in the horizontal plane of the point 44 of the receiver 17. This will become more apparent when the operation of the correlator is described.

The microwave transmitter 12 may be continuous wave, with duplex reception by the detector 17 made possible by space isolation of the receiver from the transmitter, with directional transmission and reception. Alternatively, to avoid duplexing difficulties, pulse transmission and interpulse reception can be employed.

The detector, or pickup portion of the receiver, may be constructed as indicated in FIG. 2. The four quarters 27, 28, 29 and 31 of the pickup area are filled by the mouths of four rectangular microwave horns, each horn leading to a rectangular waveguide and a crystal microwave demodulator.

These four horns and demodulators are indicated in FIG. 3 by the same reference numbers and are shown enclosed in a detector frame 17. The outputs of horns and demodulators 27 and 28 are added in the summing circuit 32 and the sum signal is applied to an $x$ differential amplifier 33 serving as a subtracting circuit. The outputs of horns and demodulators 29 and 31 are added in the summing circuit 34 and the sum signal is also applied to amplifier 33. This amplifier 33 subtracts the two signals applied to it and emits a differential signal in output conductor 36 representing the difference and having sense or polarity representing the sign of the differential. The output represented by conductor 36 is connected to an $x$ servomechanism 37 having an output shaft 22 connected to the detector 17.

Similarly, the signals from horns and demodulators 27 and 31 are added in a third summing circuit 38 having its output applied to a second, $y$ differential amplifier 39. Signals from the horns and demodulators 28 and 29 are added in a fourth summing circuit 41, and the output thereof is also applied to amplifier 39. The difference output present in conductor 42 is applied to a $y$ servomechanism 43 having an output shaft 23 connected to the detector 17.

In the operation of the correlator of FIGS. 1, 2 and 3, the aircraft must be flown so as to vary the distance $d$ in accordance with the altitude $h$ so as to keep the ratio $d/h$ constant. Let it be assumed that at a given instant the aircraft is directly over that terrain, 14, which is represented by the transmission reference transparency 16. All rays from the terrain 14 drawn through corresponding parts of the transparency 16 therefore at this instant meet at the center point 44 on the surface of the receiver pickup element 17. This point 44 is also shown at the junction of the four horns in FIG. 2. Actually, because the correlation function has a finite size, the spot of radiation at the center of FIG. 2 occupies an area and all four microwave pickup horns are equally energized. As a result, the two differential amplifiers 33 and 39, FIG. 3, emit zero differential signals and the servomechanisms 37 and 43 remain stationary. At all other points in the area of the pickup device, FIG. 2, the microwave energy is less as is shown by the correlation function describing the condition.

At any other position of the aircraft the rays 46 and 47, FIG. 1, joining the ends of the reference arrow 16 with the ends of arrow 14 representing the terrain depicted by the reference, do not meet at the center 44 but meet somewhere else. The junction of all of the rays may meet, for example, wholly in the quadrant 27, FIG. 2, and will then cause maximum input signals to be servomechanisms 37 and 43, FIG. 3.

The microwave transmitter, 12, may be omitted, and a sensitive microwave receiver, such as those developed for use in the radio astronomy art, may be employed as the receiver detector 17. The operation of the correlator is otherwise as described. In operating thus, advantage is taken of the fact that all objects at all temperatures above absolute zero radiate to some extent at all frequencies. Radiation at microwave frequencies from the terrain of the earth is sufficient to operate the correlator as described. In this case the reference map 16 will usually be required to have a pattern different from the map employed in the active case, because when a transmitter 12 is employed the map must represent reflective features of the terrain while in the natural radiation case the map must represent natural radiation features. Although often the emissivity of a material is roughly inversely proportional to its reflectivity, these properties follow different laws and in this case the forcing parameters are different, requiring the use of different maps in the active and passive cases.

The method indicated in FIG. 1 may be employed with infrared radiation in place of microwave radiation. However, if far infrared wavelengths are used, say a wavelength of 8 or 10$\mu$, construction of the transmission reference map becomes very difficult because of the very few materials which are transparent to infrared radiation of these wavelengths. Accordingly, a correlator which uses a reflective map rather than a transmissive map, as indicated in FIG. 4, is preferred.

In FIG. 4 an aircraft indicated by the rectangle 48 flies over the earth 13 toward the left. The aircraft carries a flat plate 49, obliquely positioned, which has a lower surface that is selectively reflective for the infrared wavelengths used. The reflecting areas may be made of metal foil or sheet, such as specular chrome-aluminum, while the nonreflecting areas may either be spaced permitting the radiation to pass through the plate 49 or made of an efficiently absorbing material such as graphite. The pattern of the selectively reflecting surface consists of a map of an area of the terrain, such as the area indicated by the arrow 14. The map is so arranged that its highly reflecting and nonreflecting areas respectively represent the highly reflecting and less reflecting parts of the terrain as respects infrared energy of the wavelengths employed. An infrared receiver 51 including a sensitive infrared detector unit is positioned to receive rays coming from the earth and reflected to it by the plate 49.

When the receiver 51 is positioned at one side as shown, so that the reflecting plate 49 is not parallel with the earth, the map carried by the plate must be appropriately distorted, in keystone form, to compensate for the varying distances of the several parts of the map from the detector.

An infrared generator 52 is positioned to irradiate the earth area represented by the arrow 14.

The infrared received 51 includes a detector unit which may conveniently comprise four detectors arranged in a rectangle as indicated in FIG. 2, each detector occupying the position of one of the microwave horn mouths. A circuit similar to that of FIG. 3 is employed for the detector outputs, which are added in pairs, then subtracted so as to secure differential signals. These signals may be employed for automatic control of the position of the reference map with respect to the terrain position of the aircraft. When the map is made in flight strip form and carried on rollers, the system constitutes an automatic, continuous navigating system.

Figure 5:
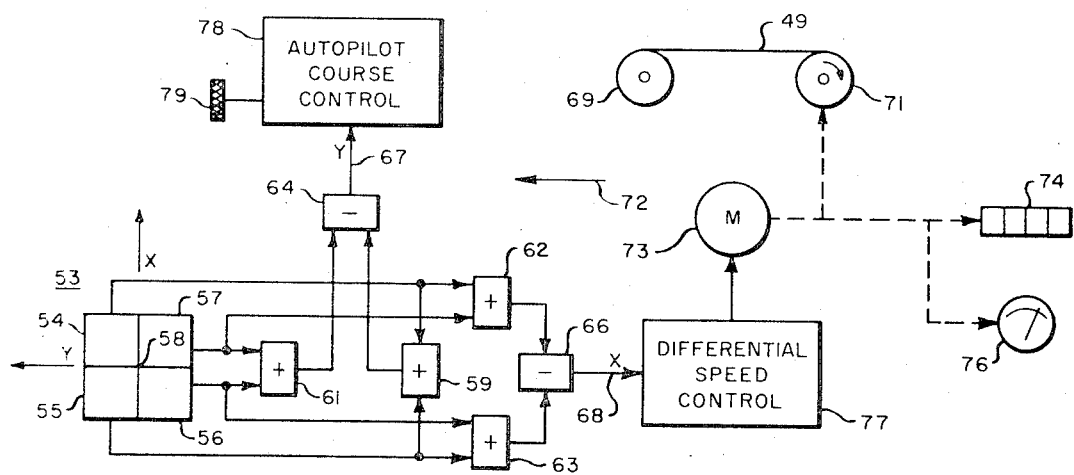
FIG. 5 is the circuit diagram of the correlator of FIG. 4, including the edge view of a rolled strip map.

Such a system is indicated in FIG. 5. The detector 53 comprises four bolometers or other infrared sensors, 54, 55, 56, and 57, arranged to meet at a center point 58. The outputs of sensors 54 and 55 are added in the summing circuit 59 and those of 56 and 57 in summing circuit 61. The outputs of sensors 54 and 57 are added in summing circuit 62 and those of sensors 55 and 56 in summing circuit 63. The outputs of summing circuits 59 and 61 are subtracted in subtracting circuit 64 and those of summing circuits 62 and 63 are subtracted at 66. The differential output signal magnitudes at conductors 67 and 68 therefore represent the linear departures of the received radiation from the center 58 in the y and x directions.

The reflection map surface 49, FIG. 4, is made in the form of a long, narrow strip representing by its variations in infrared reflectivity the variations in infrared reflectivity of the terrain over which it is planned to fly the aircraft. This flight strip is represented in FIG. 5 by the strip 49, shown in edge view, rolled on two rollers 69 and 71. The x axis extends in the longitudinal direction along the strip and the strip is positioned in the aircraft so that one surface is presented toward the ground and the receiver, as shown in FIG. 4, and so that a component of the aircraft track direction coincides with the x axis direction of the flight strip. The aircraft forward direction is indicated by the arrow 72 and the direction of motion of the flight strip 49 relative to the aircraft is in the opposite direction. The flight strip takeup roller 71 is operated by a motor 73. This motor shaft is also connected to an elapsed angle dial 74 calibrated in units of distance travelled by the aircraft, and to a speedometer 76 calibrated in units of aircraft speed. The motor 73 operates at a selected average speed. This speed can be varied above and below this average by means of a differential speed control circuit 77. Circuit 77 is controlled by a signal applied through conductor 68.

The rectangle 78 represents an autopilot. Its azimuth steering element is set by means of knob 79 and is differentially controlled relative to the knob 79 setting by signals applied through conductor 67.

In the operation of the infrared correlator shown in FIGS. 4 and 5 the infrared generator 52 irradiates the earth in an area including that below the aircraft represented by the arrow 14. The terrain selectively reflects some of the infrared radiation back to the aircraft, where some of it strikes the reflector 49, which reflects some of the incident radiation downward and to the side. The reflector 49, being constructed to reflect in a pattern representing, in its area variations of reflectivity, the area variations of reflectivity of a certain terrain, applied to the detector of receiver 51 a spot of maximum infrared intensity representing by its position on the detector the degree of fit in position of the terrain pattern compared to the position of the map pattern. When the correlation is exactly correct the spot is centered at the detector center 58, FIG. 5, with infrared radiation becoming less intense in proportion to increase of distance from the center 58. The four sections 54, 55, 56 and 57 into which the detector is divided, together with the four summing circuits 59, 61, 62 and 63 and the two subtracting or differential circuits 64 and 66, sense the direction of the maximum radiation spot on the face of the detector 43 relative to the center 48, and emit x and y error signals generally representing by their intensities both the direction and amount of the error in placement of the maximum spot relative to the center 58.

At the start of the flight the autopilot control 78 is set by the knob 79 to the course azimuth which it is desired to fly and which corresponds to the x-axis direction of the strip map 39. The motor 73 speed is set to operate the strip map 49 in its x-axis direction at a rate corresponding to the expected aircraft speed.

During the flight the error signal in conductor 67 represents the sense and the magnitude of azimuth error in the y-axis direction, and corrects the aircraft azimuth track to eliminate the error. Also the error signal in conductor 68 represents the sense and the magnitude of error in the x-axis direction, and through the differential speed control circuit 77 either increases or decreases the speed of motor 73, the correction being in such sense as to neutralize the x-axis error.

Thus the maximum correlation is maintained continuously, during flight, between the terrain and the strip map, and the maximum radiation spot is maintained substantially centered at the center point 58 on the detector 53, with the result that the aircraft flies the course centered on the strip map 49. The distance flown is indicated by the counter 74 and the aircraft speed relative to the ground along the flight path is indicated by the ground speedometer 76.

It is possible to use a negative reference map. That is, the reflective parts of the map 49 corresponds to the nonreflective terrain parts and vice versa. This has the result of causing, at correlation, a spot of minimum intensity to be centered at the detector center 58, surrounded by intensities increasing with distance from 58. The arrangements and circuits shown in FIGS. 4 and 5 are used but the senses of the error signals in conductors 67 and 68 are reversed.

The generator 52 may be dispensed with, and by employing sensitive detectors the natural infrared radiation of the terrain can be picked up either by day or by night. In this case the reference map strip will be made in accordance with the natural emission of terrain elements instead of reflection.

Since heat is retained to different degrees by different substances, it often is found that the pattern of daytime infrared emission of terrain is inverted at night, some elements which emit more strongly than others in daytime emitting less strongly at night, and vice versa. This fact may be taken into account in preparing the reference map.

What is claimed is:

1. A correlator for measuring the relative position of two objects by means of radiant energy comprising,
    an object emitting radiant energy,
    another object constituting a planar replica thereof positioned at a first selected distance from said object,
    a detector for detecting radiated energy, said detector including a planar sensing area positioned at a second selected distance from said replica, said replica being smaller than said object in the ratio of said second distance to the sum of said first and second distances, said replica including means directing said emitted radiant energy toward said detector whereby a correlation pattern of radiation intensity is applied to said planar sensing area, the distance of the center of said correlation pattern from the center of the planar sensing area being a measure of the miscorrelation of said replica with said object.

2. A correlator for measuring the position of an object relative to a substantial replica thereof comprising,
    a planar replica positioned at a first selected distance from said object,
    means applying radiant energy derived from said object on said replica,
    a radiation detector positioned at a second selected distance from said replica, said detector being provided with a sensing face, the scale of said replica being smaller than the scale of said object by the ratio of said second distance to the sum of said first and second distances, said replica being positioned to direct portions of said radiant energy toward said detector, whereby variations of radiation intensity occur at said detector in accordance with the correlation in the position of said object and said replica, and means for sensing the amount and direction of radiation intensity over said sensing face relative to a central point thereof.

3. A correlator for measuring the position of an object relative to the position of a substantial replica thereof comprising, a planar replica positioned at a first selected distance from said object, means applying radiant electromagnetic energy derived from said object to said replica, a detector including a planar sensing area, said detector being positioned at a second selected distance from said replica, said replica being smaller than said object in the ratio of said second distance to the sum of said first and second distances, said planar replica including surface means for directing selected portions of said radiant electromagnetic energy toward said detector whereby variations of electromagnetic radiation intensity fall on said planar sensing area in accordance with a correlation law and depending on the degree of correlation between said object and said replica, and means for sensing variations of said electromagnetic radiation strength over said planar sensing area relative to a central point thereof.

4. A correlator for measuring the position of a substantially flat object relative to a substantial replica thereof comprising, a planar replica of said object, said replica having a surface area designed to direct radiant energy from the portions of the area thereof in amounts which are representative of the variations in intensity of the radiant energy projected from similar portions of the surface of said object, said replica being positioned at a first selected distance from said object, means for moving said replica in a direction parallel to said object, means applying radiant electromagnetic energy derived from said object to said replica, a detector composed of a plurality of independent sensitive elemental areas, said detector being positioned at a second selected distance from said replica, said replica being smaller than said object by a scale ratio equal to the ratio of said second distance to the sum of said first and second distances, said replica including means for directing said radiant energy toward said detector in amounts varying over the planar area of the replica representative of the intensity variation of radiation over the area of said flat object, whereby the correlation pattern peak of radiation intensity variation from said planar replica is centered on said detector to an approximation representative of the degree of correlation of the position of said replica relative to the position of said object.

5. A correlator for measuring the position of a substantially flat object relative to the position of a substantial replica thereof comprising, a planar replica of said substantially flat object, said replica being positioned at a first selected distance from said object, said replica having a surface area which reflects radiant energy from portions of the area thereof in amounts which are representative of the variations in intensity of radiant energy emitted by similar portions of the surface of said object, means applying radiant energy derived from said object to said replica, a detector including a planar radiation-sensitive area composed of a plurality of independent sensitive areas, said detector being positioned at a second selected distance from said replica, said replica being positioned at an angle to reflect radiant energy incident thereon from said object toward said detector, means for adjusting the position of said replica in a direction parallel to the area of said substantially flat object, said adjustment being relative to said detector, said replica being smaller than said object by a scale ratio equal to the ratio of said second distance to the sum of said first and second distances, whereby the correlation pattern peak of radiation intensity variation from said planar replica is positioned on said detector at a distance from a selected point thereof representative of the degree of correlation of the position of said replica relative to the position of said replica relative to the position of said object.

6. An airborne correlator for measuring the position of a terrain map relative to the position of terrain represented thereby comprising, a map of a selected area of terrain, said map being positioned in an aircraft at a selected altitude above the terrain, said map having a radiant electromagnetic energy reflective surface whose variation of reflectivity over its surface is representative of variation of emission of said radiant electromagnetic energy over the surface of said terrain represented by the map, means applying radiant electromagnetic energy emitted by said terrain to said map reflective surface, and a detector including a planar electromagnetic-radiation-sensitive area including a plurality of independent sensitive areas, said detector being positioned at a selected distance from said map, the attitude of said map reflective surface being such as to reflect radiant electromagnetic energy derived from the terrain and incident upon the map surface toward said detector, said map being of a size such that the ratio thereof with respect to size of the terrain it represents is equal to the ratio of said distance to the sum of said distance and said altitude, whereby the correlation pattern peak of radiation amplitude generated by correlation of said map and said represented terrain is centered on said detector with a centering error representing the correlation error.

7. A correlator in accordance with claim 6, in which said radiant energy is in the visible electromagnetic radiation region.

8. A correlator in accordance with claim 6 in which said radiant energy is in the infrared electromagnetic radiation region.

9. A correlator in accordance with claim 6 in which said radiant energy is in the microwave region of electromagnetic wavelengths.

10. A correlator in accordance with claim 6 including an electromagnetic generator, said generator radiating energy to illuminate terrain beneath said aircraft, whereby the radiant energy derived from the represented terrain constitutes the reflection of the energy illuminating the terrain.

11. A correlator in accordance with claim 6 in which said radiant energy received from the represented terrain constitutes the natural radiations emitted thereby.

* * * * *